(12) United States Patent
Wilhelmsson et al.

(10) Patent No.: US 12,494,817 B2
(45) Date of Patent: Dec. 9, 2025

(54) TRANSMITTING A SIGNAL

(71) Applicant: Telefonaktiebolaget LM Ericsson (publ), Stockholm (SE)

(72) Inventors: Leif Wilhelmsson, Lund (SE); Guido Roland Hiertz, Aachen (DE); David Sugirtharaj, Lund (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 18/704,781

(22) PCT Filed: Oct. 28, 2021

(86) PCT No.: PCT/EP2021/079955
§ 371 (c)(1),
(2) Date: Apr. 25, 2024

(87) PCT Pub. No.: WO2023/072395
PCT Pub. Date: May 4, 2023

(65) Prior Publication Data
US 2024/0421850 A1     Dec. 19, 2024

(51) Int. Cl.
*H04B 1/715* (2011.01)

(52) U.S. Cl.
CPC ..... *H04B 1/715* (2013.01); *H04B 2001/7154* (2013.01); *H04B 2201/71307* (2013.01)

(58) Field of Classification Search
CPC .......... H04B 1/69; H04B 1/713; H04B 1/715; H04B 1/7152; H04B 1/7154;
(Continued)

(56) References Cited

U.S. PATENT DOCUMENTS

| 5,859,664 A | * | 1/1999 | Dent | ............... H04N 7/08 348/E7.024 |
| 6,246,713 B1 | * | 6/2001 | Mattisson | ............... H04L 5/006 375/132 |

(Continued)

FOREIGN PATENT DOCUMENTS

| EP | 1220499 A2 | 7/2002 |
| GB | 2399982 A | 9/2004 |
| WO | 2007009043 A1 | 1/2007 |

OTHER PUBLICATIONS

International Search Report and Written Opinion dated Jul. 18, 2022 for International Application No. PCT/EP2020/079955 filed Oct. 28, 2021; consisting of 11 pages.

(Continued)

*Primary Examiner* — James M Perez
(74) *Attorney, Agent, or Firm* — Weisberg I.P. Law, P.A.

(57) ABSTRACT

Methods and apparatus are provided. In an example aspect, a method of transmitting a signal is provided. The method includes transmitting a frequency hopping signal on a first plurality of frequency channels in a first bandwidth using a first interference detect and avoid (DAA) scheme for each of the plurality of frequency channels, detecting interference in a predetermined proportion of the first plurality of frequency channels, and transmitting the frequency hopping signal on a second plurality of frequency channels in a second bandwidth smaller than the first bandwidth without using the first interference DAA scheme in response to detecting interference in the predetermined proportion of the first plurality of frequency channels.

20 Claims, 4 Drawing Sheets

```
┌─────────────────────────────────────────────┐
│ Transmitting a frequency hopping signal on  │
│ a first plurality of frequency channels in  │
│ a first bandwidth using a first             │──702
│ interference detect and avoid (DAA) scheme  │
│ for each of the plurality of frequency      │
│ channels                                    │
└─────────────────────────────────────────────┘
                      │
┌─────────────────────────────────────────────┐
│ Detecting interference in a predetermined   │──704
│ proportion of the first plurality of        │
│ frequency channels                          │
└─────────────────────────────────────────────┘
                      │
┌─────────────────────────────────────────────┐
│ Transmitting the frequency hopping signal   │
│ on a second plurality of frequency channels │
│ in a second bandwidth smaller than the      │
│ first bandwidth without using the first     │──706
│ interference DAA scheme in response to      │
│ detecting interference in the predetermined │
│ proportion of the first plurality of        │
│ frequency channels                          │
└─────────────────────────────────────────────┘
```

700

(58) Field of Classification Search
CPC ........ H04B 2001/69; H04B 2001/7154; H04B 2201/69; H04B 2201/713; H04B 2201/7154; H04B 2201/71307; H04B 2201/71315; H04B 2201/71323; H04B 2201/71346; H04B 2201/71353; H04B 2201/71361; H04B 2201/71376

See application file for complete search history.

(56) References Cited

U.S. PATENT DOCUMENTS

| | | | | |
|---|---|---|---|---|
| 6,941,110 | B2* | 9/2005 | Kloper | H04B 1/715 455/67.11 |
| 7,006,451 | B2* | 2/2006 | Kuwahara | H04L 1/0001 370/333 |
| 7,154,938 | B2* | 12/2006 | Cumeralto | H04L 27/32 375/150 |
| 7,245,649 | B2* | 7/2007 | Haartsen | H04B 1/715 375/136 |
| 7,411,994 | B2* | 8/2008 | Haartsen | H04B 1/715 375/136 |
| 7,945,206 | B2* | 5/2011 | Wilhelmsson | H04L 1/1887 455/343.4 |
| 8,374,211 | B2* | 2/2013 | Bienas | H04L 5/0039 375/132 |
| 8,442,016 | B1* | 5/2013 | Lee | H04W 72/1215 455/41.2 |
| 8,457,023 | B2* | 6/2013 | Norlen | H04W 16/14 370/344 |
| 8,780,872 | B1* | 7/2014 | Ramamurthy | H04B 7/024 370/328 |
| 8,867,516 | B2* | 10/2014 | Jung | H04N 19/89 370/271 |
| 8,958,456 | B2* | 2/2015 | Nagai | H04B 1/715 370/320 |
| 9,325,369 | B2* | 4/2016 | Lee | H04B 1/715 |
| 9,654,443 | B2* | 5/2017 | Lindoff | H04L 61/5038 |
| 9,693,369 | B2* | 6/2017 | Nilsson | H04W 52/244 |
| 9,706,549 | B2* | 7/2017 | Taira | H04L 1/08 |
| 9,774,366 | B2* | 9/2017 | Webb | H04W 72/542 |
| 9,871,577 | B2* | 1/2018 | Haziza | H04B 7/18513 |
| 9,985,816 | B2* | 5/2018 | Di Taranto | H04L 27/2602 |
| 10,020,840 | B2* | 7/2018 | Lee | H04B 1/715 |
| 10,389,402 | B1* | 8/2019 | Krohn | H04B 1/715 |
| 10,405,345 | B2* | 9/2019 | Lindoff | H04W 74/0816 |
| 10,516,569 | B2* | 12/2019 | Lindoff | H04L 27/0006 |
| 10,594,360 | B2* | 3/2020 | Vijayasankar | H04B 1/7143 |
| 10,715,265 | B2* | 7/2020 | Siomina | H04W 24/00 |
| 10,904,885 | B2* | 1/2021 | Lopez | H04L 1/0003 |
| 11,128,405 | B2* | 9/2021 | Phan | H04L 5/0082 |
| 11,165,619 | B2* | 11/2021 | Wilhelmsson | H04L 27/0006 |
| 11,201,775 | B2* | 12/2021 | Lopez | H04B 5/45 |
| 11,251,830 | B2* | 2/2022 | Drugge | H04W 72/541 |
| 11,627,587 | B2* | 4/2023 | Aly | H04B 1/713 370/252 |
| 11,784,744 | B2* | 10/2023 | Wilhelmsson | H04L 1/0009 714/729 |
| 12,035,297 | B2* | 7/2024 | Aly | G02B 27/01 |
| 12,176,941 | B2* | 12/2024 | Rahmes | H04K 3/226 |
| 12,206,493 | B2* | 1/2025 | Bergman | H04L 1/08 |
| 12,219,483 | B2* | 2/2025 | Wilhelmsson | H04W 76/10 |
| 12,273,930 | B2* | 4/2025 | Wang | H04W 74/0841 |
| 2002/0080739 | A1* | 6/2002 | Kuwahara | H04B 1/715 370/333 |
| 2002/0080855 | A1* | 6/2002 | Watanabe | H04B 1/715 375/E1.035 |
| 2003/0156624 | A1* | 8/2003 | Koslar | H04B 1/69 375/295 |
| 2004/0125889 | A1* | 7/2004 | Cumeralto | H04L 27/32 375/132 |
| 2004/0137849 | A1* | 7/2004 | Kloper | H04B 1/715 455/67.11 |
| 2004/0240526 | A1* | 12/2004 | Schmandt | H04B 1/715 375/135 |
| 2005/0059388 | A1* | 3/2005 | Haines | H04W 52/283 455/422.1 |
| 2005/0084031 | A1* | 4/2005 | Rosen | H04B 1/69 375/295 |
| 2005/0084033 | A1* | 4/2005 | Rosen | H04L 27/2601 375/295 |
| 2005/0276241 | A1* | 12/2005 | Kamerman | H04W 28/06 370/328 |
| 2007/0242769 | A1* | 10/2007 | Yang | H04B 1/715 375/E1.036 |
| 2009/0161730 | A1* | 6/2009 | Fudge | H04B 1/71637 375/135 |
| 2009/0247076 | A1* | 10/2009 | Bartlett | H04B 1/69 455/20 |
| 2010/0029204 | A1* | 2/2010 | Gao | H04B 1/715 455/41.2 |
| 2011/0116490 | A1* | 5/2011 | Wilhelmsson | H04W 16/14 370/343 |
| 2012/0076173 | A1* | 3/2012 | Chang | H04B 1/7143 375/132 |
| 2012/0129456 | A1* | 5/2012 | Xhafa | H04W 72/1215 455/552.1 |
| 2012/0207040 | A1* | 8/2012 | Comsa | H04W 72/1215 370/252 |
| 2013/0022083 | A1* | 1/2013 | Vasseur | H04L 12/4035 375/132 |
| 2013/0039239 | A1* | 2/2013 | Lin | H04W 52/0229 370/311 |
| 2013/0057711 | A1* | 3/2013 | Jung | H04N 19/61 348/207.1 |
| 2013/0184020 | A1* | 7/2013 | Hoshihara | H04W 24/02 455/501 |
| 2013/0308685 | A1* | 11/2013 | Nagai | H04B 1/715 375/133 |
| 2014/0146857 | A1* | 5/2014 | Guichard | H04B 1/7156 375/135 |
| 2014/0269534 | A1* | 9/2014 | Persson | H04W 16/14 370/329 |
| 2014/0349594 | A1* | 11/2014 | Hoshihara | H03F 3/189 455/77 |
| 2015/0009904 | A1* | 1/2015 | Chen | H04W 52/243 370/329 |
| 2015/0126188 | A1* | 5/2015 | Lindoff | H04W 76/14 455/434 |
| 2015/0156165 | A1* | 6/2015 | Lindoff | H04W 8/005 370/329 |
| 2015/0300990 | A1* | 10/2015 | Estevez | G01N 27/82 324/240 |
| 2015/0303990 | A1* | 10/2015 | Chen | H04B 17/382 375/132 |
| 2016/0088608 | A1* | 3/2016 | Lindoff | H04W 72/21 455/452.1 |
| 2016/0337176 | A1* | 11/2016 | Lindoff | H04L 41/0803 |
| 2016/0337177 | A1* | 11/2016 | Lindoff | H04W 24/02 |
| 2017/0134882 | A1* | 5/2017 | Kao | H04W 72/1215 |
| 2017/0155443 | A1* | 6/2017 | Haziza | G01S 5/0263 |
| 2017/0288792 | A1* | 10/2017 | Kim | H04B 17/318 |
| 2017/0310357 | A1* | 10/2017 | Lee | H04B 1/715 |
| 2018/0097680 | A1* | 4/2018 | Di Taranto | H04L 27/28 |
| 2019/0028141 | A1* | 1/2019 | Padden | H04B 1/7156 |
| 2019/0123840 | A1* | 4/2019 | Siomina | H04W 24/00 |
| 2019/0132844 | A1* | 5/2019 | Lopez | H04L 1/00 |
| 2019/0173521 | A1* | 6/2019 | Liu | H04L 5/0098 |
| 2019/0239140 | A1* | 8/2019 | Arickan | H04W 40/16 |
| 2019/0268201 | A1* | 8/2019 | Wilhelmsson | H04L 27/2634 |
| 2020/0053544 | A1* | 2/2020 | Lindoff | H04W 8/005 |
| 2020/0396746 | A1* | 12/2020 | Kondareddy | H04W 72/543 |
| 2020/0412591 | A1* | 12/2020 | Lopez | H04L 27/2628 |
| 2021/0058970 | A1* | 2/2021 | Kwak | H04W 72/23 |
| 2021/0091891 | A1* | 3/2021 | Phan | H04B 1/713 |
| 2021/0120555 | A1* | 4/2021 | Badic | H04W 72/12 |
| 2021/0159940 | A1* | 5/2021 | Drugge | H04L 5/005 |
| 2021/0168831 | A1* | 6/2021 | Wilhelmsson | H04J 11/0066 |
| 2021/0204140 | A1* | 7/2021 | Ghosh | H04L 1/0068 |
| 2021/0266925 | A1* | 8/2021 | Aly | G02B 27/01 |
| 2021/0368529 | A1* | 11/2021 | Sakhnini | H04W 72/23 |
| 2021/0409172 | A1* | 12/2021 | Chen | H04L 5/0007 |

(56) References Cited

U.S. PATENT DOCUMENTS

| | | | | |
|---|---|---|---|---|
| 2022/0038323 | A1* | 2/2022 | Wilhelmsson | H04L 27/2634 |
| 2022/0104141 | A1* | 3/2022 | Kondareddy | H04W 52/288 |
| 2022/0137177 | A1* | 5/2022 | Hammerschmidt | G01S 13/003 |
| | | | | 455/456.1 |
| 2022/0159677 | A1* | 5/2022 | Hwang | H04W 72/23 |
| 2022/0166576 | A1* | 5/2022 | Harada | H04L 27/0006 |
| 2022/0201610 | A1* | 6/2022 | Wilhelmsson | H04W 52/0229 |
| 2022/0225462 | A1* | 7/2022 | Manolakos | H04W 76/20 |
| 2022/0417953 | A1* | 12/2022 | Petkov | H04W 28/0268 |
| 2023/0087730 | A1* | 3/2023 | Narula | H04W 48/16 |
| | | | | 455/41.2 |
| 2023/0121235 | A1* | 4/2023 | Gunn | H04L 1/0047 |
| | | | | 375/132 |
| 2023/0224958 | A1* | 7/2023 | Lee | H04L 5/0012 |
| | | | | 370/329 |
| 2023/0262709 | A1* | 8/2023 | Yu | H04B 1/713 |
| | | | | 370/329 |
| 2023/0276428 | A1* | 8/2023 | Aly | H04B 1/713 |
| | | | | 370/252 |
| 2023/0396354 | A1* | 12/2023 | Wilhelmsson | H04L 1/0015 |
| 2024/0015686 | A1* | 1/2024 | Rao | H04W 64/00 |
| 2024/0103123 | A1* | 3/2024 | Meier | G01S 13/343 |
| 2024/0106494 | A1* | 3/2024 | Rahmes | H04W 72/0453 |
| 2024/0251441 | A1* | 7/2024 | Wilhelmsson | H04W 16/14 |
| 2024/0406855 | A1* | 12/2024 | Wilhelmsson | H04W 48/18 |
| 2024/0421849 | A1* | 12/2024 | Wilhelmsson | H04B 1/715 |
| 2024/0421850 | A1* | 12/2024 | Wilhelmsson | H04B 1/715 |
| 2025/0142498 | A1* | 5/2025 | Lanante | H04W 84/12 |
| 2025/0176025 | A1* | 5/2025 | Liu | H04L 5/0092 |

OTHER PUBLICATIONS

International Search Report and Written Opinion dated Aug. 1, 2022 for International Application No. PCT/EP2021/079954 filed Oct. 28, 2021; consisting of 14 pages.

U.S. Office Action dated Jul. 2, 2025 for U.S. Appl. No. 18/704,281, consisting of 12 pages.

* cited by examiner

TRANSMITTING A SIGNAL

CROSS-REFERENCE TO RELATED APPLICATION

This application is a Submission Under 35 U.S.C. § 371 for U.S. National Stage Patent Application of International Application Number: PCT/EP2021/079955, filed Oct. 28, 2021 entitled "TRANSMITTING A SIGNAL WITH FREQUENCY HOPPING IN THE PRESENCE OF BROADBAND INTERFERENCE," the entirety of which is incorporated herein by reference.

TECHNICAL FIELD

Examples of the present disclosure relate to transmitting a signal, for example by a wireless communication device.

BACKGROUND

When undertaking wireless communication in license-exempt radio bands, such as for example the 2.4 GHz Industrial, Scientific and Medical (ISM) band and the 5 GHz band, some means of spectrum sharing mechanism is typically required unless the transmissions are limited to use a very low power. The two most commonly used spectrum sharing mechanisms are listen before talk (LBT), also referred to as carrier sense multiple access with collision avoidance (CSMA/CA), and frequency hopping (FH).

The working procedure of LBT is as follows. Before a transmission can be initiated, the transmitter listens on the channel to determine whether it is unoccupied (idle) or if there is already another transmission ongoing. If the channel is found to be idle, the transmission can be initiated, whereas if the channel is found to be occupied (busy), the transmitter must defer from transmission and essentially keep sensing the channel until it becomes idle. LBT is used by different flavors of IEEE 802.11, commonly referred to as Wi-Fi, operating in the 2.4 GHz ISM and 5 GHz bands. LBT is also employed by standards developed by 3GPP operating in the 5 GHz band, e.g. New Radio-Unlicensed (NR-U). If FH is used instead, the spectrum sharing is based on only using a specific part of the band for a relatively small fraction of the total time, leaving room for other transmissions. FH is the approach used by Bluetooth.

Whether to employ LBT or FH is not clear, but typically LBT is the preferred approach if the used channel bandwidth is relatively large, say 20 MHz or more. FH, on the other hand, is well suited for narrowband systems where the bandwidth is of the order of 1 or 2 MHz. To a large extent this explains why Wi-Fi uses LBT whereas Bluetooth uses FH. The primary goal for Wi-Fi is to provide high data rates, with use cases like file download and file streaming. Bluetooth, on the other hand, is more concerned with voice and other delay sensitive applications like connecting computer peripherals.

Although both LBT and FH can be viewed as effective spectrum sharing mechanisms, both typically only work well if all devices are using the same spectrum sharing mechanism, for example if all devices use LBT, or alternatively if all devices use FH. However, issues may arise if some devices use different mechanisms. As one example, a wideband system using LBT may detect a narrowband FH transmission and defer from transmitting, even though the wideband transmission would have been successful without having any noticeable impact on the narrowband transmission. Conversely, for example, a wideband system may not detect a narrowband system, since the sensed average power within the wideband channel is relatively low, and may then initiate a transmission that potentially can result in harmful interference to the narrowband system.

To allow for better coexistence between the two standards, Bluetooth has developed support for adaptive frequency hopping (AFH) utilizing the detect-and-avoid (DAA) scheme. The principle of one example of a DAA scheme is that a system should detect if a frequency channel is experiencing interference, e.g. is already occupied by another signal, and then avoid this particular frequency channel and instead use a channel that is found not to be interfered (or has not yet found to be interfered). With Bluetooth Low Energy (BLE), additional specific measures are taken to limit the interference to Wi-Fi by only using three channels for initial link establishment, and where these three channels are selected such that they will not overlap with the three most commonly used Wi-Fi channels (IEEE 802.11 channels 1, 6, and 11).

DAA or AFH has two limitations. The first is that it by necessity takes some time to determine whether a frequency channel should be considered as occupied by another system such as Wi-Fi and therefore should not be used, and also to determine when it is no longer occupied so that it can be used. How long this takes may also depend on how often the channel is used by the other system, and it can be expected that if a Wi-Fi channel is only used, say, 10% of the time many Bluetooth transmissions may be needed in order to determine that in fact the channel is used by Wi-Fi, to gather sufficient information regarding the number of BT transmission failures due to interference.

The second limitation is that AFH only works as long as it is possible to find some channels that are free (or relatively free) from interference. If for instance a Wi-Fi transmitter uses an 80 MHz channel in the 2.4 GHz ISM band (which is currently not permitted), it is clear that AFH would not work since there are no channels remaining. This may, however, be a problem if Bluetooth or another system that uses something similar to AFH is used in another frequency band such as the 6 GHz band, and uses a total bandwidth of around 80 MHz for example. In the 6 GHz band, Wi-Fi may use 80 MHz, 160 MHz, or even more in the future. This means that AFH may not work as intended if the entire 80 MHz used by Bluetooth is also used by Wi-Fi and also, as a result, that Wi-Fi may detect every Bluetooth transmission and defer from transmitting due to the LBT procedure used by Wi-Fi.

These issues are described in terms of a single Bluetooth link. Since Bluetooth is designed to support a large number of simultaneous links, the problem may be significantly worse for Wi-Fi or other systems where several Bluetooth transmissions can occur in parallel.

SUMMARY

As explained above, a wideband system may use a large bandwidth such that it may reduce the effectiveness of a narrowband system such as one using AFH. For example, a wideband system may use a frequency range that covers the entire frequency range used by the narrowband system using frequency hopping. As a result, schemes such as AFH may not be effective to improve spectrum sharing between different communication technologies.

One aspect of the present disclosure provides a method of transmitting a signal. The method comprises transmitting a frequency hopping signal on a first plurality of frequency channels in a first bandwidth using a first interference detect and avoid (DAA) scheme for each of the plurality of frequency channels, and detecting interference in a predetermined proportion of the first plurality of frequency channels. The method also comprises transmitting the frequency hopping signal on a second plurality of frequency channels in a second bandwidth smaller than the first bandwidth without using the first interference DAA scheme in response to detecting interference in the predetermined proportion of the first plurality of frequency channels.

Another aspect of the present disclosure provides apparatus for transmitting a signal. The apparatus comprises a processor and a memory. The memory contains instructions executable by the processor such that the apparatus is operable to transmit a frequency hopping signal on a first plurality of frequency channels in a first bandwidth using a first interference detect and avoid (DAA) scheme for each of the plurality of frequency channels, detect interference in a predetermined proportion of the first plurality of frequency channels, and transmit the frequency hopping signal on a second plurality of frequency channels in a second bandwidth smaller than the first bandwidth without using the first interference DAA scheme in response to detecting interference in the predetermined proportion of the first plurality of frequency channels.

A further aspect of the present disclosure provides apparatus for transmitting a signal. The apparatus is configured to transmit a frequency hopping signal on a first plurality of frequency channels in a first bandwidth using an interference detect and avoid (DAA) scheme for each of the plurality of frequency channels, detect interference in a predetermined proportion of the first plurality of frequency channels, and transmit the frequency hopping signal on a second plurality of frequency channels in a second bandwidth smaller than the first bandwidth without using an interference DAA scheme in response to detecting interference in the predetermined proportion of the first plurality of frequency channels.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, Application Specific Integrated Circuits (ASICs), Programmable Logic Arrays (PLAs), etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Certain examples of this disclosure are described in the context of a wideband signal, such as for example a Wi-Fi signal, and a narrowband interfering signal that uses frequency hopping (FH), such as for example a Bluetooth signal. However, these are merely non-limiting examples, and the examples described can be applied to any other scenario where a signal to be transmitted uses frequency hopping.

Figure 1:
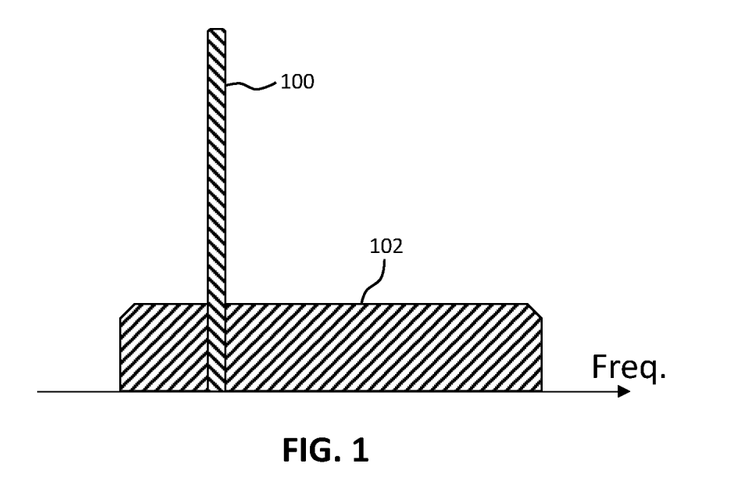
FIG. 1 shows an illustration of how a narrowband signal overlaps with a wideband signal.

FIG. 1 shows an illustration of how a narrowband signal 100 (e.g. a Bluetooth signal) overlaps with a wideband signal 102 (e.g. a Wi-Fi signal) and thus is an interference signal from the point of view of the wideband signal 102. For example, the wideband signal 102 has a first frequency range (and therefore a first bandwidth), and the narrowband signal 100 is within the first frequency range and has a bandwidth that is smaller than the first bandwidth.

In some examples, the narrowband or Bluetooth signal may not be present at the start of the transmission of the wideband or Wi-Fi signal. For example, the transmitter may use listen before talk (LBT) before making a Wi-Fi transmission, i.e. it senses the channel before initiating a transmission. The LBT procedure may indicate that there is no signal present in the first frequency range that the transmitter intends to use for the Wi-Fi transmission. Bluetooth, on the other hand, uses frequency hopping (FH) and will only cause interference to a very limited part of the frequency band, as shown in FIG. 1 for example. Bluetooth may also use adaptive frequency hopping (AFH) in some examples, where the transmitter of a Bluetooth signal avoids using certain frequencies that have been found to be severely interfered e.g. by other systems such as Wi-Fi. AFH is often an effective approach to ensure good coexistence with Wi-Fi by simply detecting and avoiding the Wi-Fi channel. However, when Wi-Fi is using large bandwidths, e.g. 80 MHz, this means that the Bluetooth system may find all channels to be interfered and thus it is not possible to apply AFH to avoid the Wi-Fi channel.

In a particular example, suppose that a Wi-Fi system and a Bluetooth system have spatially overlapping coverage areas. Furthermore, suppose that the bandwidth of the Wi-Fi system is 80 MHz, which roughly corresponds to the total bandwidth of 79 MHz used by Bluetooth. The instantaneous bandwidth of a Bluetooth signal is about 1 MHz, and Bluetooth uses AFH over the entire 79 MHz. The principle of adaptive frequency hopping (AFH) can be described as follows. In a frequency hopping system, the carrier frequency is changed in a pseudo-random fashion. In Bluetooth, this may be every 1.25 ms for example. That is, one Bluetooth transmission from a Master device and the corresponding ACK from the Slave device are sent on the same frequency, whereafter a new frequency channel is used for the next transmission. If Bluetooth is transmitting a packet at every transmission opportunity, this means that all 79 channels will be used in 79×1.25m=98.75 ms.

For AFH to work well, in some examples, it would thus be able to detect which channels are interfered in for example 1 second. This is assuming that there is no correlation with respect to how the different frequency channels are interfered. If for example it is known that there is an interferer present and its bandwidth will be 20 MHz, then this knowledge can be used to speed up the AFH algorithm considerably. However, AFH by design is intended to avoid the interfered channels and only use the non-interfered channels. For example, a Bluetooth device using AFH may detect the presence of occupied Wi-Fi channels in the 2.4 GHz industrial, scientific and medical (ISM) band. Since Bluetooth uses a 79 MHz bandwidth and a Wi-Fi channel is typically 20 MHz wide in the ISM band, this approach has been useful to avoid occupied Wi-Fi channels in some cases.

However, if a Wi-Fi transmission uses a larger bandwidth, for example 80 MHz, that completely overlaps with the full Bluetooth bandwidth, AFH may not work as intended. However, Wi-Fi may use channel puncturing as means to increase the probability to obtain access to the channel in interference prone environments. An example of the working principle of channel puncturing is as follows. When Wi-Fi performs LBT, it can determine the channel conditions for each 20 MHz sub-channel. For all sub-channels that are found to be idle (i.e. available for transmissions), transmissions may be initiated. For the sub-channels that are found to be busy, on the other hand, no transmission can take place. This means that the corresponding sub-channel is punctured when generating the signal to be transmitted. Since Wi-Fi uses orthogonal frequency division multiplexing (OFDM), puncturing may be achieved for example by simply not transmitting using the corresponding sub-carriers in the occupied sub-channels.

Although LBT with puncturing may improve coexistence by allowing a wideband signal to occupy parts of the channel when other parts are occupied by other transmissions, problems remain. For example, since Bluetooth uses frequency hopping over the entire bandwidth, and the hopping rate is fast compared to the typical duration of a Wi-Fi packet, puncturing will only be effective for the first part of the packet whereas the packet may still be interfered at a later time if a Bluetooth signal hops to a frequency in a non-punctured sub-channel. Also, for example, frequencies that are not punctured in a Wi-Fi signal may act as interference to a Bluetooth signal.

Examples of this disclosure may address or mitigate one or more of the problems described herein by providing a system whereby one or more particular frequency ranges may be unused by a transmission, such as for example a wideband or Wi-Fi transmission, even if such frequency range(s) are determined to be free, such as for example by a Listen Before Talk (LBT) procedure or similar. Leaving such frequency range(s) unused may for example allow a narrowband or Bluetooth transmitter, or a system that uses adaptive frequency hopping (AFH) or a similar system, to determine that the unused frequency range(s) are relatively free compared to some other frequency ranges and thus the AFH or similar system may over time tend to use those unused frequency range(s) instead of other frequency ranges. It is noted here that an unused frequency range is a frequency range that is unused by a transmitter for one or more transmissions, though in some cases the unused frequency range could be used by other transmissions from other transmissions e.g. using a wideband or narrowband system.

In some examples of this disclosure, a wideband system, which supports puncturing, may operate over a bandwidth that potentially covers most or all of the bandwidth or frequency range used by a narrowband system using adaptive frequency hopping (AFH) or similar. The wideband system may employ puncturing, whereby some or all frequency ranges of the available bandwidth (and over which the transmitter is capable of transmitting simultaneously) are used, and where only some ranges are used, these ranges may be contiguous or adjacent, or may be separated in frequency with one or more unused frequency ranges in between. In some examples, a frequency range is a channel such as for example a Wi-Fi channel.

In some examples, the wideband system may use Listen Before Talk (LBT) for access to the communication channel, and use puncturing when one or more frequency ranges are found during the LBT process to be busy. To ensure coexistence with the narrowband system, the wideband system may for example also puncture one or more frequency ranges that were found to be idle or available for transmission during the LBT process. This may be referred to in some examples as proactive puncturing, as it may be a means to proactively prevent coexistence issues that otherwise would occur between the wideband and narrowband systems. By proactively puncturing one or more frequency ranges, a narrowband system using AFH or similar may identify that some frequency ranges are interfered (corresponding to the non-punctured parts of the wideband signal), whereas one or more other frequency ranges are free from interference (corresponding to the punctured parts of the wideband signal). The narrowband system may then in some examples use this observation to adapt its set of hopping frequencies such that only the punctured frequency range(s) are used (or are used more often than other frequency ranges). It is noted that in some examples no changes may be needed to the narrowband system such as a system using AFH or similar. In some examples, the benefits described herein may be achieved without any explicit interaction between the wideband and the narrowband system, and the activity of the wideband system may be transparent to the narrowband system.

If a transmitter is in some examples using a mechanism to determine whether frequency ranges are available, for example LBT, it may therefore also be able to determine the amount of activity in the punctured sub-channels, thus effectively monitoring those frequency ranges. This may then be used in some examples to adapt punctured frequency ranges so that the particular frequency range(s) or number of frequency ranges can be changed depending on activity of the narrowband system.

In some examples, the wideband system may consist of multiple nodes (e.g. cells or access points). Since the narrowband system may be within the coverage area of two or more of these nodes, there may for example be coordination among these nodes such that the same frequency range(s)

are unused, even if free or unoccupied, in order to provide benefits to the narrowband system.

Figure 2:
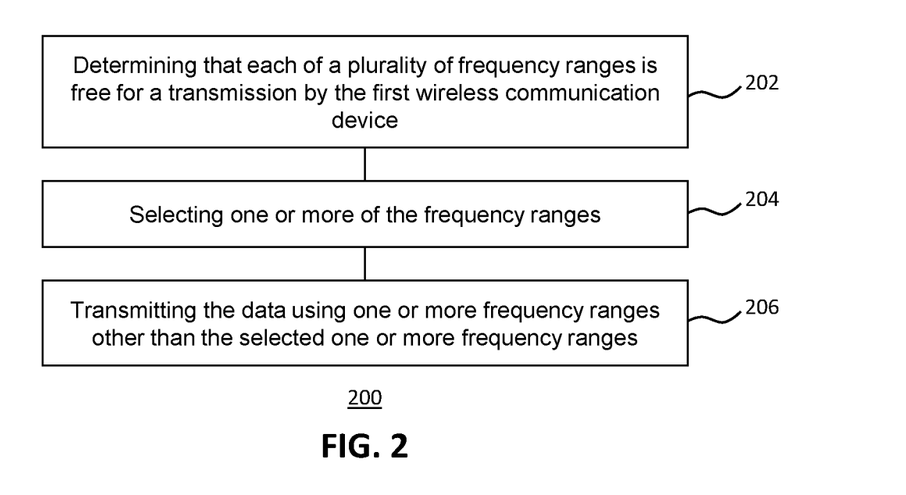
FIG. 2 is a flow chart of an example of a method in a first wireless communication device of transmitting data.

FIG. 2 is a flow chart of an example of a method 200 in a first wireless communication device of transmitting data. The first wireless communication device may be for example a wideband or Wi-Fi communication device. The method 200 comprises, in step 202, determining that each of a plurality of frequency ranges is free for a transmission by the first wireless communication device. In some examples, the plurality of frequency ranges may be the entire frequency range that the first wireless communication device is capable of using for transmission. Alternatively, for example, the plurality of frequency ranges may be a subset of frequency ranges that the first wireless communication device is capable of using for transmission, for example where some other frequency ranges are found to be unavailable or occupied, or where a data rate to be used to transmit the data allows for the subset to be used instead of all of the frequency ranges. Each frequency range may in some examples be a channel such as a Wi-Fi channel, e.g. in an unlicensed band such as the 2.4 GHz, 5 GHz or 6 GHz band.

Step 204 of the method 200 comprises selecting one or more of the frequency ranges. Next, step 206 of the method 200 comprises transmitting the data (e.g. to another wireless communication device) using one or more frequency ranges other than the selected one or more frequency ranges, e.g. using a Wi-Fi or 802.11 standard.

In some examples, determining that each of the plurality of frequency ranges is free for a transmission by the first wireless communication device comprises performing a procedure for each of the frequency ranges (the procedure may be carried out in parallel for some or all of the frequency ranges). The procedure may be for example a Listen Before Talk (LBT) procedure on the frequency ranges, such that the LBT procedure indicates that each frequency range is free for a transmission by the first wireless communication device. Alternatively, for example, the procedure may be a Clear Channel Assessment (CCA) procedure on the frequency ranges, such that the CCA procedure indicates that each frequency range is free for a transmission by the first wireless communication device.

Alternatively, for example, the procedure may be a Carrier Sense Multiple Access with Collision Avoidance (CSMA-CA) procedure on the frequency ranges, such that the CSMA-CA procedure indicates that each frequency range is free for a transmission by the first wireless communication device.

In some examples, selecting the one or more of the frequency ranges comprises selecting one or more frequency ranges that have been identified previously as being occupied by one or more signals from one or more other wireless communication devices, such as for example at least one narrowband, frequency hopping or Bluetooth signal. This may be done for example if a previous procedure (e.g. a LBT, CSMA-CA or CCA procedure) has indicated that one or more frequency ranges are occupied. Thus, for example, the first wireless communication device may assume that the frequency range(s) were occupied by a narrowband or frequency hopping signal such as a Bluetooth signal, and select one or more of those frequency ranges to avoid when making transmissions.

Selecting the one or more of the frequency ranges may comprise for example selecting one or more frequency ranges if any of the frequency ranges have been identified previously as being occupied by one or more signals from one or more other wireless communication devices. This is similar to the above feature, except that in this example, the selected frequency range(s) may or may not be frequency range(s) that have previously been identified as occupied. This may be the case for example where a previous procedure (e.g. LBT, CSMA-CA or CCA procedure) has identified one or more frequency ranges are occupied, but did not identify those particular range(s) that were occupied. Alternatively, for example, it may be assumed that the interfering signal(s) are frequency hopping, and that they may not remain in the frequency range(s) in which they were previously detected.

In some examples, selecting the one or more of the frequency ranges may comprise selecting one or more frequency ranges if one or more transmissions by the first wireless communication device have been unsuccessful. An unsuccessful transmission may be for example a transmission for which a negative acknowledgement (NACK) has been received by the first wireless communication device, as opposed to an acknowledgement (ACK), or a transmission for which no ACK or NACK is received. The method 200 may also in some examples comprise selecting a first number of frequency ranges if the one or more transmissions that have been unsuccessful comprise a first number of transmissions less than a threshold number, and selecting a second number of frequency ranges if the one or more transmissions that have been unsuccessful comprise a second number of transmissions greater than a threshold number, wherein the first number of frequency ranges is less than the second number of frequency ranges. Thus, for example, a larger number of frequency ranges may be selected and transmission in those frequency ranges avoided for a larger number of failed transmissions.

Selecting the one or more of the frequency ranges may in some examples comprise selecting the one or more of the frequency ranges based on at least one of an indication from another wireless communication device that one or more of the frequency ranges is experiencing or has experienced interference, and an indication identifying one or more of the frequency ranges that is experiencing or has experienced interference. The another wireless communication device may in some examples be a receiver of the data, or alternatively another device.

The method 200 may comprise, in some examples, for each of a plurality of further transmissions for transmitting further data, determining whether each of the plurality of frequency ranges other than the selected one or more frequency ranges is free (e.g. using a procedure such as LBT, CSMA-CA or CCA) for the further transmission by the first wireless communication device. If one or more of the frequency ranges is not free more than a predetermined number of times, the selected one or more frequency ranges (i.e. those that are avoided for transmission by the first wireless communication device) may be reselected. This may be for example because there is excessive interference within the previously selected frequency range(s). Then, the method 200 may comprise transmitting the further transmission data using one or more frequency ranges other than the selected one or more frequency ranges (i.e. other than the reselected frequency range(s)).

Figure 3:
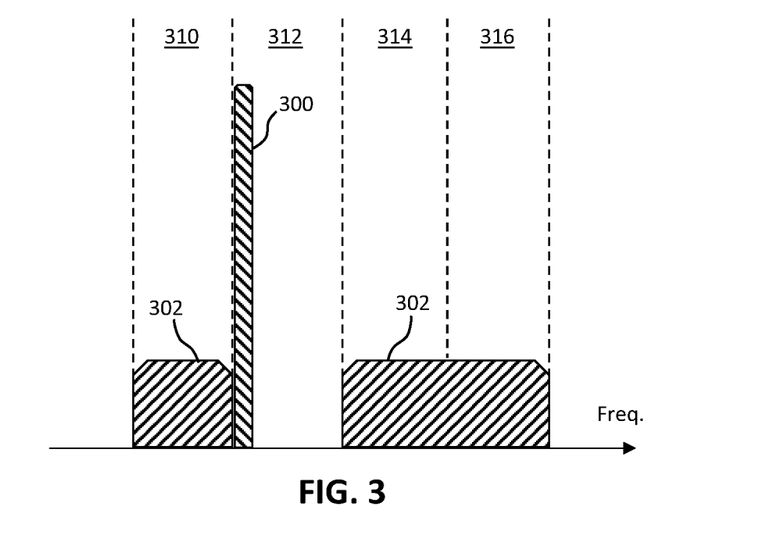
FIG. 3 shows an example of how interference to a narrowband signal may be avoided by transmitting data according to examples of this disclosure.

FIG. 3 shows an example of how interference to a narrowband signal 300 (e.g. a Bluetooth signal) by a wideband signal 302 may be avoided by transmitting data according to examples of this disclosure. The transmitter of the wideband signal may be capable of transmitting simultaneously in a plurality of frequency ranges. In the example shown, there are four contiguous frequency ranges 310, 312, 314 and 316, though there may be another number of frequency ranges in other examples, and/or the frequency ranges may be non-contiguous. It can be seen in this example that the wideband signal 302 occupies multiple non-contiguous frequency ranges, and the wideband signal 302 is not transmitted in frequency range 312. Thus for example the frequency range 312 may be selected for non-transmission or puncturing of the wideband signal 302 in accordance with examples described herein, and the wideband signal 302 is transmitted in frequency ranges 310, 314 and 316. The narrowband signal 300 occupies the frequency range 312 in the example shown in FIG. 3, and thus the wideband signal 302 does not cause interference to the narrowband signal 300 in the particular time instance shown. Similarly, the narrowband signal 300 does not cause interference to the wideband signal 302. The narrowband signal 300 may remain within the frequency range 312 in some examples, for example if the narrowband signal 300 is a frequency hopping signal which uses AFH or a similar approach.

Figure 4:
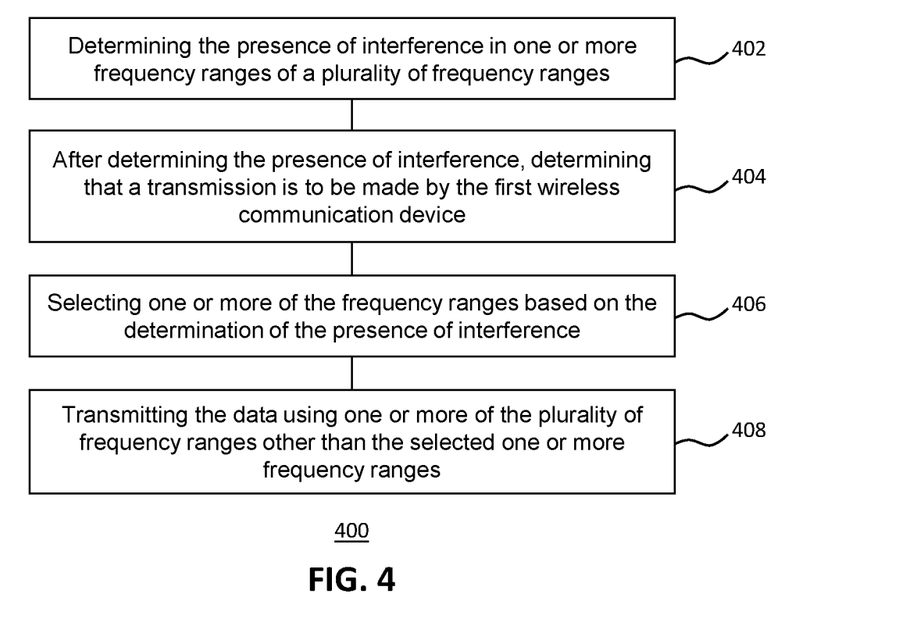
FIG. 4 is a flow chart of another example of a method in a first wireless communication device of transmitting data.

FIG. 4 is a flow chart of another example of a method 400 in a first wireless communication device of transmitting data. The first wireless communication device may be for example a wideband or Wi-Fi communication device. The method 400 comprises, in step 402, determining the presence of interference (e.g. the presence of at least one frequency hopping, narrowband or Bluetooth signal) in one or more frequency ranges of a plurality of frequency ranges. In some examples, the plurality of frequency ranges may be the entire frequency range that the first wireless communication device is capable of using for transmission. Alternatively, for example, the plurality of frequency ranges may be a subset of frequency ranges that the first wireless communication device is capable of using for transmission, for example where some other frequency ranges are found to be unavailable or occupied, or where a data rate to be used to transmit the data allows for the subset to be used instead of all of the frequency ranges. Each frequency range may in some examples be a channel such as a Wi-Fi channel, e.g. in an unlicensed band such as the 2.4 GHz, 5 GHz or 6 GHz band.

The method 400 also comprises, in step 404, after determining the presence of interference in step 402, determining that a transmission is to be made by the first wireless communication device (e.g. data may be received in a buffer or from a higher layer for transmission to another wireless communication device). Step 406 of the method 400 comprises selecting one or more of the frequency ranges based on the determination of the presence of interference, and step 408 comprises transmitting the data using one or more of the plurality of frequency ranges other than the selected one or more frequency ranges, for example using a Wi-Fi or 802.11 standard, or in unlicensed spectrum.

Determining the presence of interference in the one or more frequency ranges of the plurality of frequency ranges may for example comprise one or more of performing a Listen Before Talk (LBT) procedure, Clear Channel Assessment (CCA) procedure performing a Carrier Sense Multiple Access with Collision Avoidance (CSMA-CA) procedure on each of the one or more frequency ranges of the plurality of frequency ranges. Additionally or alternatively, for example, this may comprise receiving an indication (e.g. from the receiver of the data or another device) from another wireless communication device that one or more of the frequency ranges is experiencing or has experienced interference, or receiving an indication (e.g. from the receiver of the data or another device) identifying one or more of the frequency ranges that is experiencing or has experienced interference.

Transmitting the data using one or more frequency ranges other than the selected one or more frequency ranges in step 408 may in some examples comprise determining that each of the one or more frequency ranges of the plurality of frequency ranges other than the selected one or more frequency ranges is free for a transmission by the first wireless communication device, e.g. by using a LBT, CCA or CSMA-CA procedure on each of the one or more frequency ranges of the plurality of frequency ranges other than the selected one or more frequency ranges. In some examples, such procedures may also indicate that each of the selected range(s) is free or occupied.

In some examples, determining the presence of interference in the one or more frequency ranges of the plurality of frequency ranges may comprise assuming the presence of interference in the one or more frequency ranges that have been identified previously as being occupied by one or more signals from one or more other wireless communication devices. For example, if there was a previously identified interferer such as a Bluetooth interferer, the first wireless communication device may assume that the interfering signal will return at some point, and may proactively avoid transmitting in the selected frequency range(s). Additionally or alternatively, for example, determining the presence of interference in the one or more frequency ranges of the plurality of frequency ranges comprises determining that one or more transmissions by the first wireless communication device have been unsuccessful. The first wireless communication device may for example assume that the failed transmission(s) were due to a narrowband interferer and thus may decide to proactively avoid transmitting in the selected frequency range(s).

A particular example of this disclosure will now be described as follows. In a first step, a Wi-Fi system (or other wideband system) identifies that there potentially is Bluetooth interference present. This may be based for example on a Wi-Fi receiver identifying that the received wideband signal is interfered by a narrowband interferer. The different Wi-Fi stations (STAs), i.e. the transmitter and receiver (either of which may be an access point in some examples) can then exchange information about which frequency range(s) are interfered in this way to enhance the accuracy or speed up the detection of a Bluetooth interferer. In a second step, the Wi-Fi system determines the bandwidth over which it is suffering from Bluetooth interference. The Wi-Fi system may for example perform a search to see if another Wi-Fi channel is available and switch to this in order to avoid the Bluetooth interference. If no such channel is found available, or if for some other reason the Wi-Fi system decides to stay on the same channel, the next step is initiated.

In a third step, the Wi-Fi system selects one or more sub-channels that are not to be used for transmission. That is, the Wi-Fi signal punctures these sub-channels irrespective of whether a procedure (e.g. LBT, CSMA-CA or CCA) determines these sub-channels to be busy or idle. In a fourth step, the Wi-Fi system performs transmission, though some of the sub-channels may be semi-permanently punctured. That is, for example, subsequent transmissions may automatically puncture the same channel(s) or frequency range(s). LBT may still be performed in the punctured sub-channels and used for estimating the intensity of the Bluetooth interference.

In a fifth step, which can take place at regular intervals (and may also precede the third step), the Wi-Fi system updates the set of sub-channels or frequency ranges that are punctured. This updating may mean for example increasing the set by one sub-channel or decreasing the set by one sub-channel. An increase of the set may for example be in response to a determination that the amount of interference is very high in the punctured sub-channel(s), and the increase would therefore be made in order to further improve the performance for the Bluetooth system. The amount of interference may be measured for example by determining the percentage that LBT on the punctured channels declare that the channel is busy. The Wi-Fi transmitter may additionally or alternatively for example take the power of the detected interference into account for the cases where sub-channels are found to be busy. For example, a channel may be semi-permanently punctured if the interference power is above a threshold level.

Figure 5:
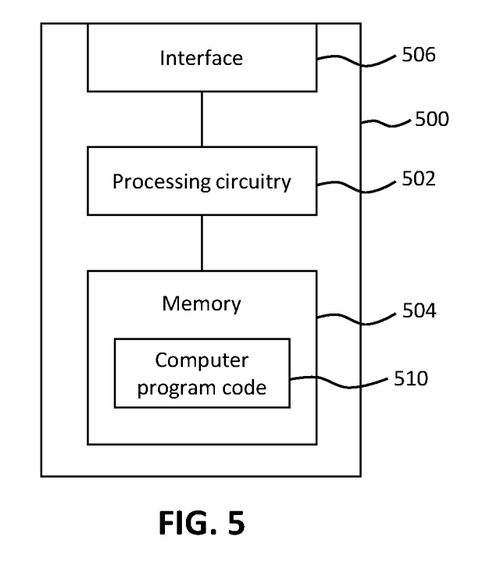
FIG. 5 is a schematic of an example of an apparatus in a first wireless communication device for transmitting data.

FIG. 5 is a schematic of an example of an apparatus 500 in a first wireless communication device for transmitting data. The apparatus 500 comprises processing circuitry 502 (e.g., one or more processors) and a memory 504 in communication with the processing circuitry 502. The memory 504 contains instructions, such as computer program code 510, executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable/configured to determine that each of a plurality of frequency ranges is free for a transmission by the first wireless communication device, select one or more of the frequency ranges, and transmit the data using one or more frequency ranges other than the selected one or more frequency ranges. In some examples, the apparatus 500 is operable/configured to carry out the method 200 described above with reference to FIG. 2.

Figure 6:
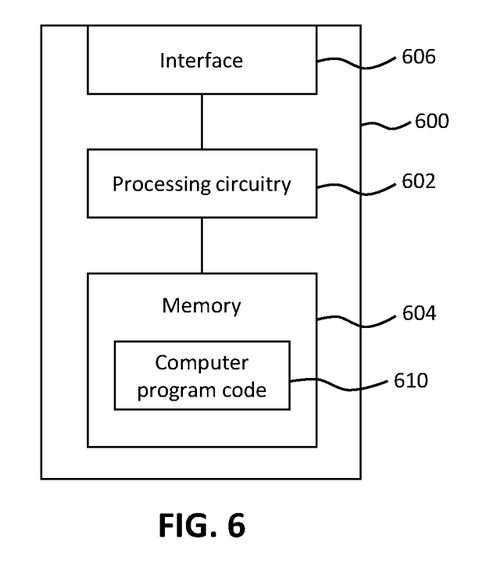
FIG. 6 is a schematic of an example of an apparatus in a first wireless communication device for transmitting data.

FIG. 6 is a schematic of an example of an apparatus 600 in a first wireless communication device for transmitting data. The apparatus 600 comprises processing circuitry 602 (e.g., one or more processors) and a memory 604 in communication with the processing circuitry 602. The memory 604 contains instructions, such as computer program code 610, executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable/configured to determine the presence of interference in one or more frequency ranges of a plurality of frequency ranges, after determining the presence of interference, determine that a transmission is to be made by the first wireless communication device, select one or more of the frequency ranges based on the determination of the presence of interference, and transmit the data using one or more of the plurality of frequency ranges other than the selected one or more frequency ranges. In some examples, the apparatus 600 is operable/configured to carry out the method 400 described above with reference to FIG. 4.

The above examples discuss for example proactive puncturing of a wideband signal such as a Wi-Fi signal. However, in other circumstances, considering a frequency hopping signal (e.g. Bluetooth signal) that uses a frequency avoidance scheme such as Detect and Avoid (DAA) or Adaptive Frequency Hopping (AFH), a problem may be experienced if a wideband system such as Wi-Fi is using such a large bandwidth that it covers the entire bandwidth used by the frequency hopping system using DAA/AFH. Some examples are referred to herein in the context of AFH, though AFH is considered to be a particular implementation of DAA and these examples may extend to any form of DAA. AFH is based on classifying different frequency channels as interfered or non-interfered and avoid frequency channels that are identified as interfered. Specifically, for example, if all frequency channels used by the frequency hopping system are found to be interfered then the AFH scheme may be ineffective in avoiding frequency channels used by the wideband system, and/or may suffer from performance degradation. Here, frequency channels used by the wideband system may refer for example to FH frequency channels that are narrower in bandwidth than the channels in the wideband system but may be interfered by the wideband system. Thus, for example, a signal in the wideband system may "use" or interfere with one or more FH frequency channels.

When a frequency hopping (FH) system (which may be a narrowband system) is to coexist with a wideband system by means of Detect and Avoid (DAA), this will only be effective for example when there are some channels or frequency channels that the FH system can use or that are found to not be interfered. However, the wideband system may only decide to not use a specific part of the available bandwidth if it has been found to be busy during a LBT procedure for example. This means that one may enter a deadlock situation for example where DAA will not be effective as the wideband system constantly uses all of the available bandwidth. Not only may this prevent the narrowband system from having interference-free access to any channels, it may also mean that the narrowband system will interfere with the wideband system as it is allowed to evaluate the different frequency channels at certain times to see if the corresponding frequency channels have become free.

For DAA or AFH to be effective for a FH transmission, in some examples, there should be some frequency channels that are not interfered. Referring to the situation illustrated in FIG. 1, it may be seen that DAA AFH will not work as intended as there are no non-interfered frequency channels for the FH system to use. In a specific example, suppose that Bluetooth is using DAA on each of its 79 frequency channels. If interference is detected on a Bluetooth (or other FH system) frequency channel this will then be avoided for a specific time, e.g. 500 ms, after which it can once again be used and re-evaluated. Suppose that one or more Wi-Fi networks are utilizing the frequency band for almost 100% of the time. Thus there will be a collision every time the Bluetooth system transmits, irrespective of which channel or frequency is used by the Bluetooth system. Even if Wi-Fi occasionally detects a Bluetooth transmission during its LBT process, and therefore punctures its transmissions, it is unlikely in some examples that the Bluetooth system will restrict itself to the part of the band that the Wi-Fi system punctured because the frequency hopping scheme may use all frequency channels with equal probability.

Examples of this disclosure relate to transmitting a frequency hopping signal. Such examples may be employed alongside or independently of above-described examples relating to transmitting data such as those described with reference to FIGS. 2 and 4. In examples that relate to transmitting a frequency hopping signal, the FH may perform DAA on all or a limited number of frequency channels available to the FH system. If interference is detected on all these frequency channels, the FH system may for example be allowed to use a limited part of the spectrum even if this part of the spectrum has not been found to be unoccupied. For example, the FH system may not use DAA for this limited part of the spectrum, or may instead use DAA with relaxed constraints, e.g. a shorter time period for avoiding frequency channels that are found to be interfered within this limited bandwidth. In particular examples, such as for example those described above with reference to FIGS. 2 and 4, or other cases where a wideband system may use a limited part of the available bandwidth, this may for example cause a wideband system such as Wi-Fi to tend to avoid the limited bandwidth used by the FH system and thus the two systems may coexist effectively within the same frequency band.

Thus, for example, the FH system with DAA may avoid at least some of the interfered frequency channels, which means that the narrowband system will only cause interference to a limited part of the wideband system (assuming that the wideband system is also using the limited part of the bandwidth, as well as other parts), which may be advantageous for the wideband system. In particular, for example, if the wideband system is using LBT it may detect that the limited part of the bandwidth appears to be interfered whereas other parts of the spectrum are not, or are interfered to a lesser degree. The wideband system may therefore puncture its transmission so that no transmission will be done in the part of the spectrum to which the FH system has been limited.

Figure 7:
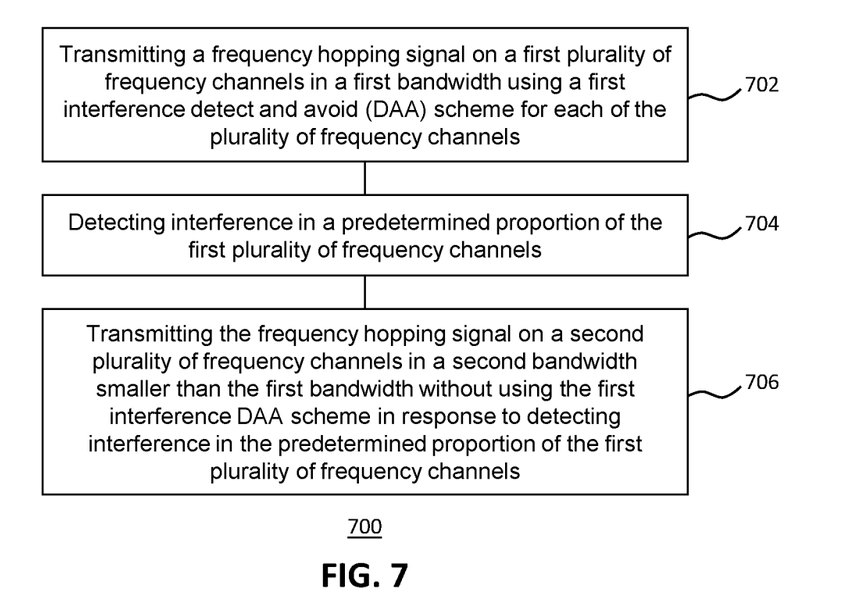
FIG. 7 is a flow chart of an example of a method of transmitting a signal.

FIG. 7 is a flow chart of an example of a method 700 of transmitting a signal. The signal is a frequency hopping (FH) signal, such as for example a narrowband or Bluetooth signal. However, in other examples (including any example of this disclosure which discusses transmission of a FH signal) the signal may be transmitted according to another technology, such as for example reduced capability new radio (RedCap NR), MulteFire or enhanced Machine Type Communication (eMTC), or any variety or variation thereof that uses frequency hopping. In some examples, the signal may be a signal according to a 3GPP or Bluetooth specification (or may be transmitted in accordance with such a specification). The signal may be used for example to transmit data.

The method 700 comprises, in step 702, transmitting a frequency hopping signal on a first plurality of frequency channels in a first bandwidth using a first interference detect and avoid (DAA) scheme for each of the plurality of frequency channels. The first bandwidth may be for example all of the available bandwidth or alternatively may be a subset of that bandwidth. The plurality of frequency channels themselves may be contiguous, i.e. adjacent, or alternatively may be separated in frequency e.g. by one or more other frequency channels or channels. The predetermined proportion of the first plurality of frequency channels may comprise for example at least half of the frequency channels, all of the frequency channels, a number of frequency channels that corresponds to a bandwidth of at least one Wi-Fi channel or Wi-Fi sub-channel, or multiple Wi-Fi channels or sub-channels. Alternatively, the predetermined proportion may comprise any number of one or more of the first plurality of frequency channels.

Transmitting the frequency hopping signal on the first plurality of frequency channels in the first bandwidth using the interference DAA scheme for each of the plurality of frequency channels may in some examples comprise, for each of the first plurality of frequency channels, detecting whether there is interference on the frequency channel, and if there is interference detected on the frequency channel, marking the frequency channel as unusable for a predetermined period of time, such as 500 ms for example. In some examples, a frequency channel may be marked as unusable after transmitting a portion of the first frequency hopping signal on the frequency channel. The detection of the interference itself may be performed before or after the portion is transmitted on that frequency channel in some examples. The DAA scheme may be for example Adaptive Frequency Hopping (AFH).

Step 704 of the method 700 comprises detecting interference in a predetermined proportion of the first plurality of frequency channels. This may comprise for example detecting interference in one or more frequency ranges, wherein each of the frequency ranges includes a subset of the first plurality of frequency channels. Each frequency range may for example have a 20 MHz bandwidth, and thus may be for example a wideband (e.g. Wi-Fi) channel or sub-channel. The method 700 in some examples may comprise determining that there is interference in all frequency channels in a frequency range if interference is detected in at least one of the first plurality of frequency channels within the frequency range. For example, if DAA detects interference on one frequency channel within the frequency range, which may correspond for example to a wideband channel or sub-channel, the method 700 may assume that all frequency channels within that frequency range are interfered (e.g. may assume the presence of a wideband signal within that frequency range). In some examples, detecting interference in one or more frequency ranges comprises performing Listen Before Talk (LBT), Clear Channel Assessment (CCA) or Carrier Sense (CS) on each of the one or more frequency ranges. The interference may be detected as part of the DAA scheme, or may be detected separately from the scheme, e.g. an interference detection procedure that is not required to comply with the particular DAA or AFH scheme.

Step 706 of the method 700 comprises transmitting the frequency hopping signal on a second plurality of frequency channels in a second bandwidth smaller than the first bandwidth without using the first interference DAA scheme in response to detecting interference in the predetermined proportion of the first plurality of frequency channels. Thus for example the frequency hopping signal may be limited to a limited part of the bandwidth. This limited part may be contiguous or may be in two or more parts separated by one or more other frequency channels. The second plurality of frequency channels may in some examples be a subset of the first plurality of frequency channels, or the second frequency channels may include one or more frequency channels not in the first plurality of frequency channels (and may or may not include one or more of the first plurality of frequency channels). The first plurality of frequency channels may in some examples comprise a first plurality of FH channels, and the second plurality of frequency channels may comprise a second plurality of FH channels.

In some examples, transmitting the frequency hopping signal on the second plurality of frequency channels without using the first interference DAA scheme may comprise transmitting the frequency hopping signal on the second plurality of frequency channels using a second interference DAA scheme different to the first interference DAA scheme. For example, the first interference DAA scheme marks frequency channels on which interference is detected as unusable for a first predetermined time period, such as 500 ms. The second interference DAA scheme marks frequency channels on which interference is detected as unusable for a second predetermined time period which is shorter than the first predetermined time period. The second predetermined time period may be zero ms (for example such that effectively the frequency channels within the second plurality of frequency channels are not avoided even if interference is detected on those frequency channels), or may be greater than zero but less than the first predetermined time period, e.g. 200 ms. Alternatively, for example, transmitting the frequency hopping signal on the second plurality of frequency channels without using the first interference DAA scheme may comprise transmitting the frequency hopping signal on the second plurality of frequency channels without using any interference DAA scheme. Thus for example the frequency channels of the second plurality of frequency channels may be used without checking for interference or without taking any avoidance action if any interference is detected on those frequency channels. In other words, for example, the frequency hopping signal may be transmitted on each of the second plurality of frequency channels without detecting whether there is interference on the frequency channel, or regardless of whether interference is detected on the frequency channel or was previously detected on the frequency channel.

In some examples, the detection of interference in step 702 may be implemented in any of the following example ways:

1. Sequential DAA—where the transmitting device transmits the frequency hopping signal on a frequency channel, and then determines whether there is interference on the frequency channel and stores the result. The frequency channels (i.e. the first or second plurality of frequency channels) are traversed sequentially (e.g. in ascending or descending frequency order) until fully covered. Determining whether there is interference may comprise for example measuring on the frequency channel, or alternatively may be determined by the transmitter, e.g. through an acknowledgement (ACK) or negative acknowledgement (NACK) response, or determination of signal-to-interference ratio (SIR) by the receiver.
2. Random DAA—where the device transmits the frequency hopping signal on a channel, and then determines whether there is interference on the frequency channel and stores the result. The frequency channels are traversed randomly or pseudo-randomly until fully covered.
3. Sequential LBT—where the device performs a measurement such as CAA or LBT on each frequency channel sequentially or randomly/pseudo-randomly without any further intentions on transmitting if the frequency channels are free.

In some examples, if there are N frequency channels (which may be for example all of the first plurality of frequency channels or a subset of them, for example corresponding to one or more wideband channels or sub-channels), the detection of interference in step 704 may be performed according to any of the following examples:

1. The transmitting device may compute the average Received Signal Strength Indicator (RSSI) measured on all N frequency channels. If the average RSSI measured exceeds a threshold, the N frequency channels in the spectrum are made "unavailable" for a given period of time before being reassessed.
2. The transmitting device determines if the RSSI measure on each of the N frequency channels exceeds a threshold RSSI, and marks the frequency channel as unavailable if so. If the number of frequency channels marked as unavailable exceeds a threshold number of frequency channels, then all N frequency channels are marked as unavailable. In an example, a FH transmission may be made on 1 MHz channels in a 20 MHz bandwidth, and the threshold number of frequency channels is 10 channels. Then, if more than 10 frequency channels are marked as unavailable, all frequency channels within the 20 MHz bandwidth may be marked as unavailable for a period of time before being reassessed.

In some examples, ensuring that the FH system performs DAA for some part of the spectrum (e.g. the predetermined portion of the first plurality of frequency channels), a wideband system may be able to find a significant part of the total channel bandwidth to be free from interference or less impacted by interference from the FH system. Allowing the FH system to use a limited part of the spectrum after having performed DAA in the predetermined portion of the first plurality of frequency channels may for example allow a wideband system to detect that a part of the band is suffering from interference and in this way the wideband system can make effective use of this knowledge. For example, the wideband system may puncture the transmissions (e.g. using the methods described herein) or use a different channel to avoid the interference from the FH system.

It is also worth noting that the coexistence improvements conveyed by examples of transmitting a FH signal as disclosed herein may be achieved without any explicit interaction between the wideband and the FH system. In particular, for example, transmission of the FH signal according to examples of this disclosure may be implemented by a narrowband system, but in some examples may not require any updates to legacy wideband devices as these may continue to use LBT.

A particular example method will now be described. In a first step, a frequency hopping system such as Bluetooth performs DAA on some of its different frequency channels. In some examples, the system may use knowledge of a wideband system such as Wi-Fi and in particular the channel raster that is used by the wideband system. For example, the FH system may not treat the different FH channels or frequency channels as independent, but instead may take into account the fact that frequency channels adjacent to an interfered frequency channel may also be interfered in a similar way if a wideband interferer is present.

In a next step, if the FH system has performed DAA on a sufficiently large part of the bandwidth (e.g. the predetermined portion of the frequency channels) over which it performs frequency hopping, it may conclude that it has to avoid all frequency channels. The FH system may then transmit on a subset of the available frequency hopping channels without performing DAA, or alternatively it may use a subset of all frequency hopping channels, even if these channels have been identified as interfered. It should be noted that although the FH system in this way may interfere with the wideband system, the interference will be limited to a certain part of the band. In a particular example, if the FH system has performed DAA over the full frequency range of 79 MHz and detected interference in all channels/frequency channels, it may limit itself to transmit on frequency channels corresponding to one 20 MHz wideband channel, such as for example the frequency range 312 shown in FIG. 3.

Figure 8:
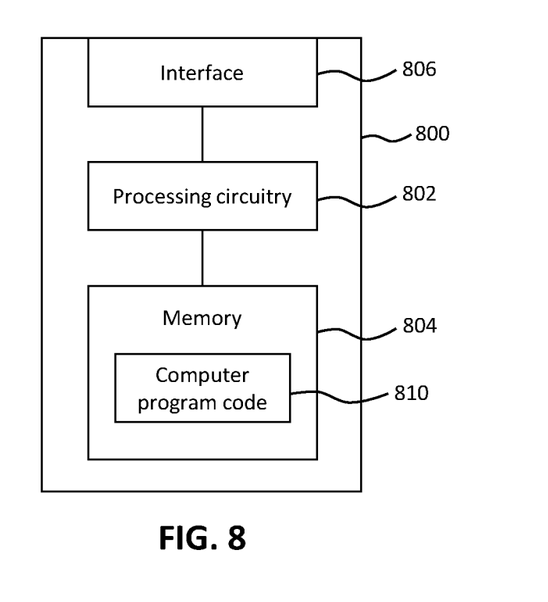
FIG. 8 is a schematic of an example of an apparatus for transmitting a signal.

FIG. 8 is a schematic of an example of an apparatus 800 for transmitting a signal. The apparatus 800 comprises processing circuitry 802 (e.g., one or more processors) and a memory 804 in communication with the processing circuitry 802. The memory 804 contains instructions, such as computer program code 810, executable by the processing circuitry 802. The apparatus 800 also comprises an interface 806 in communication with the processing circuitry 802. Although the interface 806, processing circuitry 802 and memory 804 are shown connected in series, these may alternatively be interconnected in any other way, for example via a bus.

In one embodiment, the memory 804 contains instructions executable by the processing circuitry 802 such that the apparatus 800 is operable/configured to transmit a frequency hopping signal on a first plurality of frequency channels in a first bandwidth using an interference detect and avoid (DAA) scheme for each of the plurality of frequency channels, detect interference in a predetermined proportion of the first plurality of frequency channels, and transmit the frequency hopping signal on a second plurality of frequency channels in a second bandwidth smaller than the first bandwidth without using an interference DAA scheme in response to detecting interference in the predetermined proportion of the first plurality of frequency channels. In some examples, the apparatus 800 is operable/configured to carry out the method 7 described above with reference to FIG. 7.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e., the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting a signal, the method comprising:
   transmitting a frequency hopping signal on a first plurality of frequency channels in a first bandwidth using a first interference detect and avoid (DAA) scheme for each of the plurality of frequency channels;
   detecting interference in a predetermined proportion of the first plurality of frequency channels; and
   transmitting the frequency hopping signal on a second plurality of frequency channels in a second bandwidth smaller than the first bandwidth without using the first interference DAA scheme in response to detecting interference in the predetermined proportion of the first plurality of frequency channels.

2. The method of claim 1, wherein detecting interference in the predetermined proportion of the first plurality of frequency channels comprises detecting interference in one or more frequency ranges, wherein each of the frequency ranges includes a subset of the first plurality of frequency channels, wherein each frequency range has a 20 MHz bandwidth.

3. The method of claim 1, comprising determining that there is interference in all frequency channels in a frequency range if interference is detected in at least one of the first plurality of frequency channels within the frequency range.

4. The method of claim 1, wherein detecting interference in one or more frequency ranges comprises performing Listen Before Talk (LBT), Clear Channel Assessment (CCA), Energy Detection (ED) or Carrier Sense (CS) on each of the one or more frequency ranges.

5. The method of claim 1, wherein transmitting the frequency hopping signal on the second plurality of frequency channels in a second bandwidth smaller than the first bandwidth without using the first interference DAA scheme comprises:
   transmitting the frequency hopping signal on the second plurality of frequency channels using a second interference DAA scheme different to the first interference DAA scheme; or transmitting the frequency hopping signal on the second plurality of frequency channels without using any interference DAA scheme; and
   wherein the first interference DAA scheme marks frequency channels on which interference is detected as unusable for a first predetermined time period, and the second interference DAA scheme marks frequency channels on which interference is detected as unusable for a second predetermined time period, wherein the first predetermined time period is longer than the second predetermined time period.

6. The method of claim 1, wherein transmitting the frequency hopping signal on the first plurality of frequency channels in the first bandwidth using the interference DAA scheme for each of the plurality of frequency channels comprises, for each of the first plurality of frequency channels, detecting whether there is interference on the frequency channel, and if there is interference detected on the frequency channel, marking the frequency channel as unusable for a predetermined period of time, wherein, for each of the first plurality of frequency channels, detecting whether there is interference on the frequency channel, and if there is interference detected on the frequency channel, marking the frequency channel as unusable for a predetermined period of time is performed after transmitting a portion of the first frequency hopping signal on the frequency channel.

7. The method of claim 1, wherein detecting interference in a predetermined proportion of the first plurality of frequency channels comprises, for each of the predetermined proportion of the plurality of frequency channels, detecting interference in the frequency channel as part of the DAA scheme.

8. The method of claim 1, wherein the frequency hopping signal comprises a signal according to a 3GPP or Bluetooth specification.

9. The method of claim 1, wherein transmitting the frequency hopping signal on the second plurality of frequency channels in the second bandwidth smaller than the first bandwidth without using the first interference DAA scheme comprises:
   transmitting the frequency hopping signal on each of the second plurality of frequency channels without detecting whether there is interference on the frequency channel; or
   transmitting the frequency hopping signal on each of the second plurality of frequency channels regardless of whether interference is detected on the frequency channel or was previously detected on the frequency channel.

10. The method of claim 1, wherein the second plurality of frequency channels comprise frequency channels within at least one Wi-Fi channel or Wi-Fi sub-channel.

11. An apparatus for transmitting a signal, the apparatus comprising a processor and a memory, the memory containing instructions executable by the processor such that the apparatus is operable to:
- transmit a frequency hopping signal on a first plurality of frequency channels in a first bandwidth using a first interference detect and avoid (DAA) scheme for each of the plurality of frequency channels;
- detect interference in a predetermined proportion of the first plurality of frequency channels; and
- transmit the frequency hopping signal on a second plurality of frequency channels in a second bandwidth smaller than the first bandwidth without using the first interference DAA scheme in response to detecting interference in the predetermined proportion of the first plurality of frequency channels.

12. The apparatus of claim 11, wherein the memory contains instructions executable by the processor such that the apparatus is operable to detect interference in the predetermined proportion of the first plurality of frequency channels by detecting interference in one or more frequency ranges, wherein each of the frequency ranges includes a subset of the first plurality of frequency channels, wherein each frequency range has a 20 MHz bandwidth.

13. The apparatus of claim 12, the memory contains instructions executable by the processor such that the apparatus is operable to determine that there is interference in all frequency channels in a frequency range if interference is detected in at least one of the first plurality of frequency channels within the frequency range.

14. The apparatus of claim 12, wherein the memory contains instructions executable by the processor such that the apparatus is operable to detect interference in one or more frequency ranges by performing Listen Before Talk (LBT), Clear Channel Assessment (CCA) or Carrier Sense (CS) on each of the one or more frequency ranges.

15. The apparatus of claim 11, wherein the memory contains instructions executable by the processor such that the apparatus is operable to transmit the frequency hopping signal on the second plurality of frequency channels in a second bandwidth smaller than the first bandwidth without using the first interference DAA scheme by:
- transmitting the frequency hopping signal on the second plurality of frequency channels using a second interference DAA scheme different to the first interference DAA scheme; or
- transmitting the frequency hopping signal on the second plurality of frequency channels without using any interference DAA scheme, wherein the first interference DAA scheme marks frequency channels on which interference is detected as unusable for a first predetermined time period, and the second interference DAA scheme marks frequency channels on which interference is detected as unusable for a second predetermined time period, wherein the first predetermined time period is longer than the second predetermined time period.

16. The apparatus of claim 11, wherein the memory contains instructions executable by the processor such that the apparatus is operable to transmit the frequency hopping signal on the first plurality of frequency channels in the first bandwidth using the interference DAA scheme for each of the plurality of frequency channels by, for each of the first plurality of frequency channels, detecting whether there is interference on the frequency channel, and if there is interference detected on the frequency channel, marking the frequency channel as unusable for a predetermined period of time, wherein, for each of the first plurality of frequency channels, detecting whether there is interference on the frequency channel, and if there is interference detected on the frequency channel, marking the frequency channel as unusable for a predetermined period of time is performed after transmitting a portion of the first frequency hopping signal on the frequency channel.

17. The apparatus of claim 11, wherein the memory contains instructions executable by the processor such that the apparatus is operable to detect interference in a predetermined proportion of the first plurality of frequency channels by, for each of the predetermined proportion of the plurality of frequency channels, detecting interference in the frequency channel as part of the DAA scheme.

18. The apparatus of claim 11, wherein the frequency hopping signal comprises a signal according to a 3GPP or Bluetooth specification.

19. The apparatus of claim 11, wherein the memory contains instructions executable by the processor such that the apparatus is operable to transmit the frequency hopping signal on the second plurality of frequency channels in the second bandwidth smaller than the first bandwidth without using the first interference DAA scheme by:
- transmitting the frequency hopping signal on each of the second plurality of frequency channels without detecting whether there is interference on the frequency; or
- transmitting the frequency hopping signal on each of the second plurality of frequency channels regardless of whether interference is detected on the frequency channel or was previously detected on the frequency channel.

20. The apparatus of claim 11, wherein the second plurality of frequency channels comprise frequency channels within at least one Wi-Fi channel or Wi-Fi sub-channel.

* * * * *